Feb. 10, 1953  R. E. CUTLER  2,628,086
AIR FLOW MEASURING APPARATUS
Filed Sept. 30, 1950
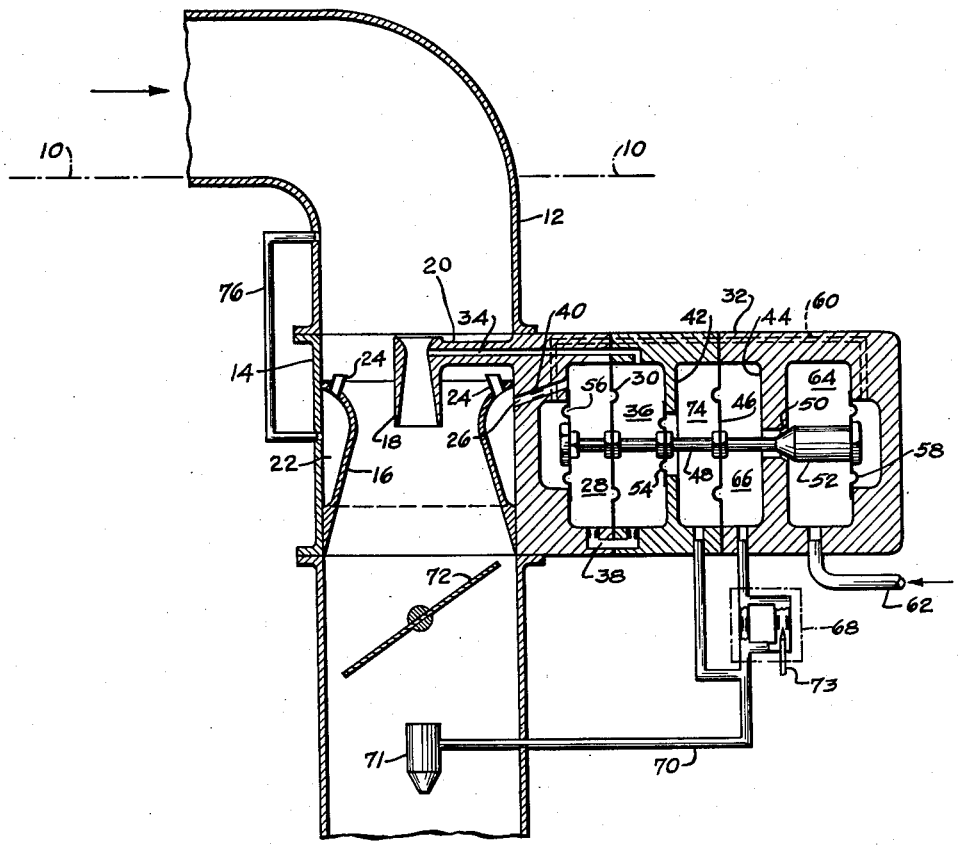
INVENTOR.
ROSWELL E. CUTLER.
BY
ATTORNEY Patented Feb. 10, 1953

2,628,086

UNITED STATES PATENT OFFICE 2,628,086

AIR FLOW MEASURING APPARATUS

Roswell E. Cutler, Paterson, N. J., assignor to Curtiss-Wright Corporation, a corporation of Delaware Application September 30, 1950, Serial No. 187,796

4 Claims. (Cl. 261—69)

This invention relates to apparatus for measuring the air flow to an internal combustion engine for controlling the engine fuel supply and is particularly directed to such apparatus including means for minimizing adverse effects of icing and/or snow conditions in the air whose flow is being measured.

In conventional apparatus such as a carburetor or other fuel-air proportioning means for aircraft engines, the air flow to the engine is measured by means providing an air pressure differential proportional to said air flow and the fuel flow is controlled thereby so as to provide a fuel pressure differential proportional to the air flow and balancing said air pressure differential. In such apparatus, the air flow pressure differential not only should provide an accurate measure of the air flow without appreciably obstructing said flow but said pressure differential should be large enough to accurately control the fuel valve. For this purpose it is conventional practice to use, as the air flow measurement, the pressure differential between the total or impact pressure of the air as measured by a Pitot tube or tubes and the air pressure at the throat of a boost Venturi tube or tubes. With this combination, when icing conditions exist in the entering air, ice tends to form across the Pitot tubes whereupon the air flow pressure differential decreases without a corresponding decrease in air flow thereby causing a decrease in the rate of fuel supply. If the ice formation substantially closes said Pitot tubes, then the fuel supply may decrease to the point where the combustion mixture is too lean for engine operation. To prevent this the engine may be equipped with de-icing means whereby the air supply to the engine is heated upstream of the Pitot tubes whenever icing conditions exist or are present in the surrounding atmosphere. If however the aircraft is flying at a relatively high altitude, say 20,000 feet, this de-icing operation by heating the entering air is objectionable in that the density of said air generally would be decreased to such an extent that the engine would no longer be able to maintain its power output at said altitude.

An object of the present invention comprises the provision of a fuel-air proportioning apparatus in which the air flow is normally measured by means of the pressure differential between the pressure at the throat of a boost Venturi tube and the Pitot tube pressure of the entering air and in which means are provided for preventing any excessive leaning out of the combustion mixture should said Pitot tubes become partially or even completely closed. In accordance with the present invention a static pressure tube is connected in parallel with the Pitot tubes whereby the pressure measured by said Pitot-static tubes combination cannot drop below the static pressure of the air even if the Pitot tubes should become completely closed as by ice.

Other objects of the invention will become apparent upon reading the annexed detailed description in connection with the drawing which comprises a schematic sectional view of a portion of an engine fuel and air intake system embodying the invention.

Referring now to the drawing, a portion of an aircraft engine is schematically indicated at 10, said engine having an air scoop or duct 12 having its air entrance end directed forwardly into the direction of air flow over said engine. A section 14 of said duct is provided with a main Venturi tube 16 and a boost Venturi tube 18 is supported by an arm 20 with its downstream end terminating substantially at the throat of the main Venturi tube 16.

An annulus 22 is formed between the main Venturi tube 16 and the adjacent wall of the duct section 14. One or more Pitot tubes 24 are directed upstream from the main Venturi tube, said Pitot tubes transmitting the impact or total pressure of the air within the duct 12 to the annulus 22. The pressure within the annulus 22 is transmitted by a passage 26 to a chamber 28 disposed on one side of a flexible diaphragm 30, said diaphragm being supported by and extending across the carburetor housing 32. A passageway 34 connects the chamber 36, disposed on the other side of the flexible diaphragm 30, with the throat of the boost Venturi tube 18. A restricted bleed passage 38 is generally connected around the diaphragm 30. With this arrangement, the diaphragm 30 is subjected to a pressure differential which is a function of the rate of air flow through the duct 12, said pressure differential urging the diaphragm 30 to the right, as viewed in the drawing. It is also common practice to provide a restriction 40 in the passage 26 together with means, such as illustrated in Patent No. 2,411,287, for varying said restriction with altitude in order to compensate for the changes in the density of the air entering the duct 12 with changes in the altitude.

The carburetor housing 32 is also provided with fixed partitions 42 and 44 together with a flexible diaphragm 46 extending across said housing between said partitions. The flexible diaphragms 30 and 46 are connected together for joint movement by a valve stem 48. The valve stem 48 extends through a valve opening 50 in the fixed partition 44 and is provided with a valve head 52. A small flexible diaphragm 54 provides a seal between the valve stem 48 and the fixed partition 42 and small flexible diaphragms 56 and 58 provide seals at the ends of the valve stem 48. A passage 60 interconnects the chambers at the two ends on the valve stems. Fuel under pressure is supplied from a conduit 62 to a chamber 64 in the housing 32 from which said fuel flows through the valve opening 50 into a chamber 66 disposed on one side of the diaphragm 46. From the chamber 66 the fuel flows through a metering orifice system 68 and thence to the engine through a conduit 70. As illustrated, the conduit 70 terminates in a fuel discharge nozzle 71 disposed in the air intake duct 12 downstream of the air throttle valve 72. Instead of discharging the fuel into the engine induction system from the conduit 70 to provide a combustible mixture which is distributed to the engine cylinders, said fuel could, for example, be distributed and discharged directly into the engine cylinders by means of a fuel injection pump system, a suitable fuel injection pump system being disclosed in Patent No. 2,487,655.

The fuel pressure downstream of the orifice system 68 is transmitted to a chamber 74 disposed on the other side of the diaphragm 46 whereby said diaphragm is subjected to a fuel pressure differential substantially proportional to the fuel flow, said fuel pressure differential opposing the air pressure differential on the diaphragm 30. With this arrangement the fuel valve 52 is automatically controlled so that the engine is supplied with a combustion mixture having a predetermined ratio of fuel and air. In general the fuel metering orifice system 68 is variable, for example, as provided by a needle valve 73 whereby the fuel-air ratio may be varied. A more complete fuel metering orifice system is disclosed in said first-mentioned patent.

The structure so far described comprises a conventional carburetor system. With said conventional carburetor structure, the pressure differential between the total or impact pressure of the air and the suction pressure of the boost Venturi tube is used as a measure of the air flow. Under icing conditions of the air entering the duct 12, the upstream ends of the Pitot tubes 24 tend to ice-over. Such icing-over of the Pitot tubes tends to reduce the pressure differential on the diaphragm 30 without a corresponding decrease in the air flow through the duct 12 whereupon the fuel valve 52 moves to the left (as viewed in the drawing) to reduce the fuel flow thereby decreasing the fuel-air ratio of the combustible mixture supplied to the engine. If the ends of the Pitot tubes ice-over sufficiently, the fuel air ratio will decrease to such an extent that the engine will stop.

Conventional carburetor de-icing equipment comprises means for heating the air in the engine intake duct. This however decreases the density of the engine intake air so that if, for example, the engine is operating at a high altitude, this reduction of air density by the de-icing equipment may make it necessary for the aircraft to fly at a much lower altitude in order that the engines can maintain their power output. This difficulty is avoided with the present invention by providing a passageway 76.

As illustrated, one end of the passageway 76 communicates with the annulus 22 and its other end opens through a side wall of the air intake duct 12 a substantial distance upstream of the boost Venturi tube 18 and Pitot tubes 24 so as to be subject to the static air pressure in said duct. With this arrangement, the end of the passage 76 communicating with the duct 12 does not obstruct air flow into said duct and is not disposed in the vicinity of anything obstructing said flow so that there is substantially no tendency for the end of the passageway 76 communicating with the duct 12 to ice-over even though icing conditions should exist in the air entering said duct.

With the carburetor structure described, there is a small flow of air through the Pitot tubes 24 into the annulus 22 and thence through the passages 26, 38 and 34 to the throat of the boost Venturi tube 18. The addition of the passage 76 increases the flow of air through the Pitot tubes into the annulus 22, a portion of this air now returning to the duct 12 through the passage 76 thereby causing some reduction in the pressure in the annulus 22 below the pressure which would exist in said annulus in the absence of the passage 76. In order to keep this reduction in pressure to a small value so that the addition of the passage 76 has little or no effect on the fuel-air ratio maintained by the carburetor when the Pitot tubes are open, the air flow resistance through the passage 76 should be quite large compared to the combined air flow resistance through the Pitot tubes 24. On the other hand however the flow resistance of the passage 76 should be small compared to the flow resistance of the passage 38 so that the pressure drop across the passage 38 is large compared to the pressure drop in the passage 76 as a result of the small flow through said passage 76 to the throat of the boost Venturi tube 18 when the Pitot tubes are closed by ice. With this combination the air flow through the intake duct 12 is normally measured by the pressure differential between the total or impact pressure of the engine intake air and the suction pressure of the boost Venturi tube 18 notwithstanding the addition of the static pressure passage 76 in parallel with the Pitot tubes and, when the Pitot tubes ice-over, the upstream static pressure of said intake engine air is substituted for its total pressure in said air flow measurement. Since said static pressure is less than the total pressure of the engine intake air, the carburetor will operate to lean out the combustion mixture when the Pitot tubes ice over. This leaning out, however, is small enough that the range of fuel-air ratio mixture control of a conventional aircraft engine carburetor (by varying the fuel metering orifice system) is sufficient to enable the operator to adjust the carburetor so as to restore the fuel-air ratio of the combustion mixture to a value at which the engine can operate.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Mechanism for controlling the fuel-air ratio of the combustion mixture of an engine having an air intake duct; said mechanism comprising a Venturi tube disposed in said duct for air flow therethrough; a Pitot tube having an open end directed upstream into the air flow in said duct;

a first passageway having one end communicating with the throat of said Venturi tube; a second passageway having one end communicating with said Pitot tube; means responsive to changes in the pressure differential between said first and second passageways for controlling the flow of fuel to said engine; and a third passageway having one end communicating with said duct so as to be subjected to the static air pressure in said duct and having its other end communicating with said second passageway, said third passageway being closed to said first passageway between its said ends.

2. Mechanism for controlling the fuel-air ratio of the combustion mixture of an engine having an air intake duct; said mechanism comprising a Venturi tube disposed in said duct for air flow therethrough; a Pitot tube having an open end directed upstream into the air flow in said duct; a first passageway having one end communicating with the throat of said Venturi tube; a second passageway having one end communicating with said Pitot tube; means responsive to changes in the pressure differential between said first and second passageways for controlling the flow of fuel to said engine; and a third passageway having one end communicating with said duct so as to be subjected to the static air pressure in said duct and having its other end communicating with said second passageway independently of said first passageway.

3. Mechanism for controlling the fuel-air ratio of the combustion mixture for an engine having an air intake duct; said mechanism comprising a housing; a flexible diaphragm dividing said housing into a pair of chambers; means operatively connected to said diaphragm for varying the rate of fuel flow to said engine in response to changes in the pressure differential between said chambers; a Venturi tube disposed in said duct for air flow therethrough; a Pitot tube having an open end directed upstream into the air flow in said duct; a first passageway having one end communicating with the throat of said Venturi tube and having its other end communicating with one of said chambers; a second passageway having one end communicating with said Pitot tube and having its other end communicating with the other of said chambers; means providing a restricted passage between said chambers whereby air flows from said Pitot tube through said second passageway to one of said chambers and thence through said restricted passage into said other chamber and into said first passageway to the throat of said Venturi tube; and a third passageway having one end communicating with said duct so as to be subjected to the static air pressure in said duct and having its other end communicating with said second passageway independently of said first passageway so that if said Pitot tube should become closed air would flow from said third passageway through said second passageway into said one chamber and thence through said restricted passage into said other chamber and into said first passageway to the throat of said Venturi tube.

4. Mechanism for controlling the fuel-air ratio of the combustion mixture for an engine having an air intake duct; said mechanism comprising a housing; a flexible diaphragm dividing said housing into a pair of chambers; means operatively connected to said diaphragm for varying the rate of fuel flow to said engine in response to changes in the pressure differential between said chambers; a Venturi tube disposed in said duct for air flow therethrough; Pitot tube means directed upstream into the air flow in said duct; a first passageway having one end communicating with the throat of said Venturi tube and having its other end communicating with one of said chambers; a second passageway having one end communicating with said Pitot tube means and having its other end communicating with the other of said chambers; means providing a restricted passage between said chambers whereby air flows from said Pitot tube means through said second passageway to said one chamber and thence through said restricted passage into said other chamber and into said first passageway to the throat of said Venturi tube; and a third passageway having one end communicating with said duct upstream of said Venturi tube so as to be subjected to the static air pressure in said duct and having its other end communicating with said second passageway independently of said first passageway so that if said Pitot tube means should become closed air would flow from said third passageway through said second passageway into said one chamber and thence through said restricted passage into said other chamber and into said first passageway to the throat of said Venturi tube, said third passageway having a flow resistance which is large compared to that of said Pitot tube means and which is small compared to that of said restricted passage.

ROSWELL E. CUTLER.

REFERENCES CITED

The following references are of record in the file of this patent:

UNITED STATES PATENTS

| Number | Name | Date |
| --- | --- | --- |
| 2,411,287 | Mock | Nov. 19, 1946 |